US012281635B2

(12) United States Patent
Rabaut et al.

(10) Patent No.: US 12,281,635 B2
(45) Date of Patent: Apr. 22, 2025

(54) DEVICE AND METHOD FOR MOUNTING A WIND TURBINE COMPONENT ON A WIND TURBINE TOWER

(71) Applicant: DEME Offshore BE NV, Zwijndrecht (BE)

(72) Inventors: Dieter Wim Jan Rabaut, Ghent (BE); Victor Alexander Hanenburg, Rotterdam (NL)

(73) Assignee: DEME Offshore BE NV, Zwijndrecht (BE)

( * ) Notice: Subject to any disclaimer, the term of this patent is extended or adjusted under 35 U.S.C. 154(b) by 146 days.

(21) Appl. No.: 18/038,860

(22) PCT Filed: Nov. 23, 2021

(86) PCT No.: PCT/EP2021/082690
§ 371 (c)(1),
(2) Date: May 25, 2023

(87) PCT Pub. No.: WO2022/112250
PCT Pub. Date: Jun. 2, 2022

(65) Prior Publication Data
US 2024/0018939 A1    Jan. 18, 2024

(30) Foreign Application Priority Data
Nov. 26, 2020 (BE) .................................. 2020/5856

(51) Int. Cl.
*F03D 13/10*    (2016.01)
*B66C 1/10*    (2006.01)

(52) U.S. Cl.
CPC ............ *F03D 13/139* (2023.08); *B66C 1/108* (2013.01); *F05B 2230/61* (2013.01)

(58) Field of Classification Search
CPC ....... F03D 13/139; F03D 13/10; B66C 1/108; F05B 2230/61; Y02E 10/72
See application file for complete search history.

(56) References Cited

U.S. PATENT DOCUMENTS

2009/0159549 A1\*   6/2009   Trede ..................... F03D 1/0658
                                                                 212/270

FOREIGN PATENT DOCUMENTS

| CN | 108190725 B | 3/2020 |
|----|----|----|
| EP | 2072812 A2 | 6/2009 |
| EP | 3670421 A1 | 6/2020 |
| WO | 2017071719 A1 | 5/2017 |

\* cited by examiner

*Primary Examiner* — Joseph Ortega
(74) *Attorney, Agent, or Firm* — The Webb Law Firm

(57) ABSTRACT

Described is a device for placing a component of a wind turbine on a wind turbine tower. The device includes a hoisting frame which is suspended from a hoisting hook of a hoisting means, and which is provided with take-up cables whereby the component is taken up in the hoisting frame. The hoisting frame is embodied such that in a first position of the hoisting frame relative to the hoisting hook the centre of gravity of the taken-up component and a centre of gravity of the hoisting frame are situated on either side of a vertical plane which runs through the hoisting hook and which does not comprise any of the centres of gravity. The invention likewise relates to a method which makes use of the invented device.

26 Claims, 12 Drawing Sheets

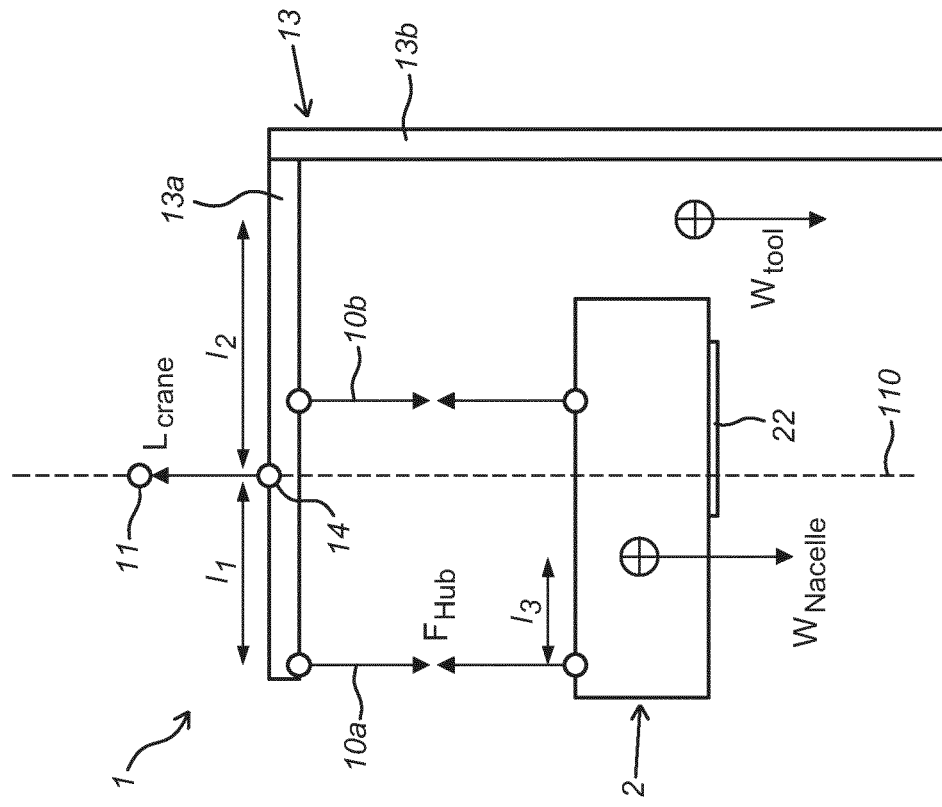
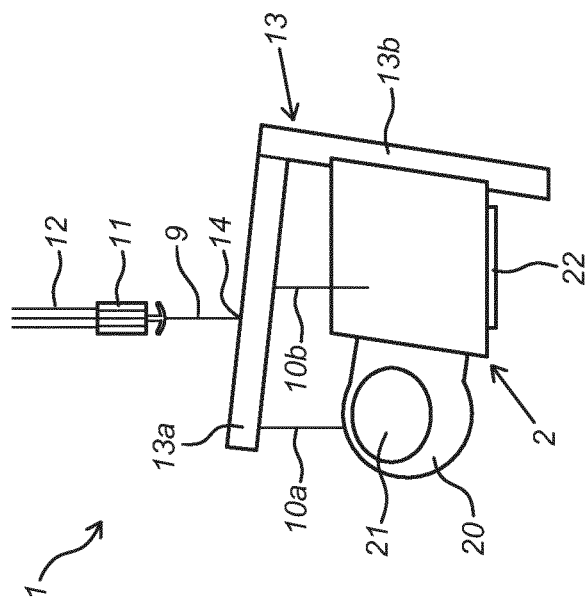
Fig. 1B
Fig. 1A

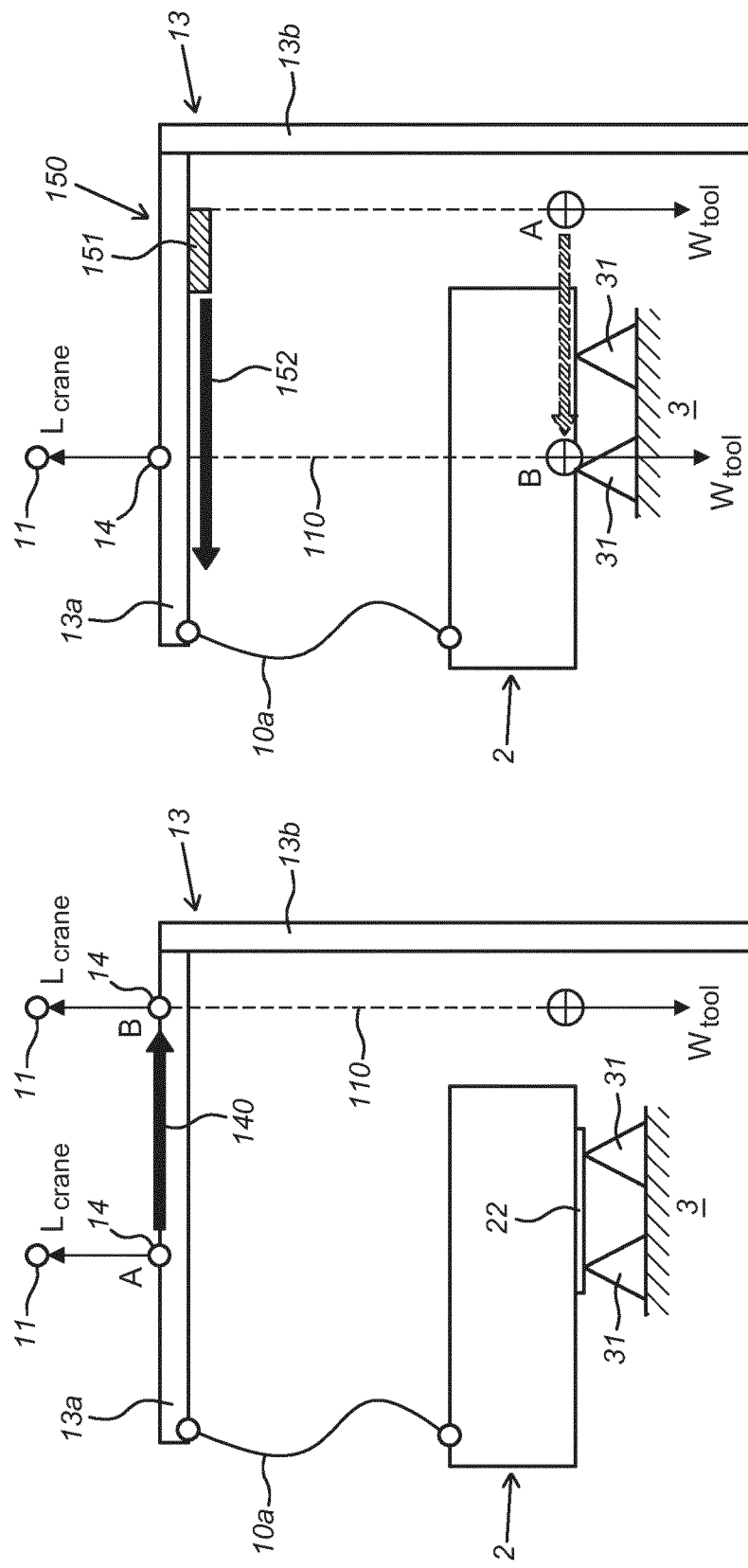

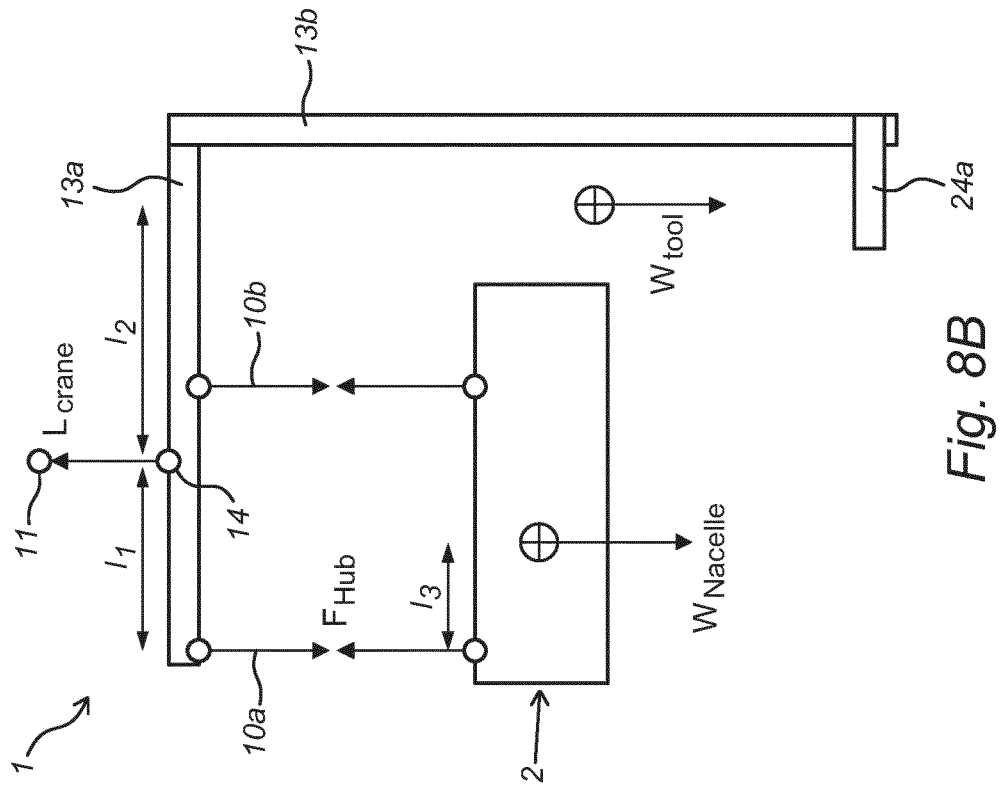
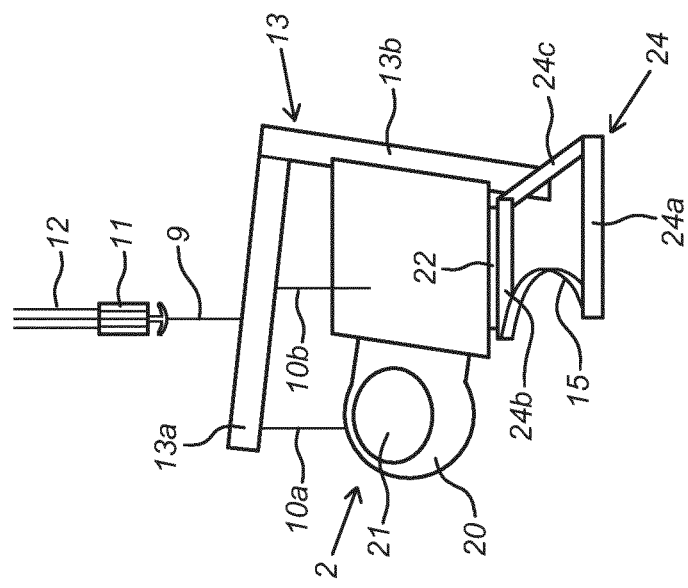
Fig. 8B
Fig. 8A

DEVICE AND METHOD FOR MOUNTING A WIND TURBINE COMPONENT ON A WIND TURBINE TOWER

CROSS REFERENCE TO RELATED APPLICATIONS

This application is the United States national phase of International Patent Application No. PCT/EP2021/082690 filed Nov. 23, 2021, and claims priority to Belgian Patent Application No. 2020/5856 filed Nov. 26, 2020, the disclosures of which are hereby incorporated by reference in their entireties.

FIELD OF THE INVENTION

Background of the Invention

The invention relates to a device for mounting a component of a wind turbine on a wind turbine tower. The invention likewise relates to a method for mounting a component of a wind turbine on a wind turbine tower, wherein use is made of the device. The invention relates particularly to a device and method for mounting a nacelle, a wind turbine blade or a complete rotor of a wind turbine on a wind turbine tower.

Mounting on a wind turbine tower is understood to mean placing and mounting a component directly on a wind turbine tower, such as when a nacelle is mounted, or mounting a component on another component already placed on the wind turbine tower, such as when a wind turbine blade is mounted on a nacelle already mounted on a wind turbine tower. For the purpose of mounting the wind turbine component this component is provided with a connecting flange which can be mounted on a second connecting flange present on the wind turbine tower.

Although the invention will be elucidated mainly within the context of placing a component of a wind turbine at sea (offshore), the device and method according to the invention can also be used on land (onshore). When a wind turbine component is mounted at sea the advantages of the invention become most clearly manifest, especially when the mounting takes place from a floating device, such as a floating platform.

Description of Related Art

The number of high structures erected, maintained or repaired on land or offshore is growing. A typical example is a wind turbine (also referred to hereinbelow as WTG) comprising a gondola (or nacelle) which is placed on a wind turbine tower or mast and forms the housing for electromechanical equipment such as a power generator. The nacelle is provided with a hub on which a number of wind turbine blades are arranged, these together forming a rotor. The wind turbine blades convert the kinetic energy of the wind into a rotating movement of the shaft of the nacelle, which is converted into electrical energy by the power generator.

During the placing of components of such large structures the components are taken up according to the prior art by a lifting crane and placed and mounted on an already available support structure for the structure, or on an already placed component of the structure. In the case of a wind turbine the support structure can for instance comprise a wind turbine tower placed on a suitable foundation.

During the lifting of a wind turbine component with an offshore lifting crane mounted on a vessel movements of the component will be caused by movements of the vessel itself, such as pitch, yaw, roll, surge, sway and heave. The lifting and placing of large, slender components, such as for instance a wind turbine blade, can also be hampered by wind load. A wind turbine blade in particular has to be attached by means of bolt connections to a hub, this requiring a precise positioning of the wind turbine blade relative to a hub already installed on a wind turbine tower. During mounting of a wind turbine nacelle from a floating vessel on an offshore foundation—a turbine tower fixed to the seabed, or optionally a floating wind turbine tower—the relative movements between the nacelle taken up by a hoisting means and the foundation must also be controlled in order to bring the nacelle in line with the receiving connecting flange.

In some turbines, particularly turbines with direct drive, the centre of gravity of the nacelle assembly (i.e. also without installed blades) is positioned outside the flange interface between the upper side of the tower and the nacelle. In other words, the centre of gravity of the wind turbine component is in this case placed eccentrically relative to the connecting flange of the component. During installation of such a component, an unstable setup may result when load is transmitted from the hoisting hook to the connecting flange, when the connecting flange of the component comes into contact with an upper side of the wind turbine tower, particularly of a receiving connecting flange. For this reason additional support may be necessary until the (permanent) flange connection has been brought about. This can be achieved in known manner by not transmitting the full weight of the component to the wind turbine tower until after a bolt connection of the two connecting flanges is in place. This does mean that the duration until full load transmission from the first flange contact must take into account a (permanent) bolt operation being carried out. This transitional situation can therefore last for some time. The duration of this transitional situation is a significant risk factor particularly when the installation or mounting is performed from a floating vessel. The vessel with the lifting crane can indeed be subject to continuous environmental impacts which result in continuous movements of a hoisting hook from which the component is suspended.

For the above stated reasons it is desirable to at least partially reduce this exposure by either 1. decreasing the duration between the first flange contact and the flange lock or 2. having the hoisting device absorb the movements of the hoisting hook to greater extent, or a combination of the two.

An object of the present invention is therefore to provide a device and method with which a wind turbine component can be placed and mounted on a wind turbine tower, wherein the relative movements between a wind turbine component taken up with a hoisting means and the wind turbine tower can be controlled better than is the case in the prior art.

SUMMARY OF THE INVENTION

This object is achieved according to the invention by providing a device having the features described herein. A device for mounting on a wind turbine tower a wind turbine component with connection, such as a connecting flange, and with a centre of gravity which lies eccentrically relative to the connection, comprises a hoisting frame which is suspended from a hoisting hook of a hoisting means, and which is provided with one or more take-up cables whereby the component is taken up in the hoisting frame, wherein the hoisting frame is embodied such that in a first position of the hoisting frame relative to the hoisting hook the centre of gravity of the taken-up component and a centre of gravity of the hoisting frame are situated on either side of a vertical plane which runs through the hoisting hook and which does not comprise the centres of gravity.

The invented device is designed such that the load transmission of the full weight of the component to the wind turbine tower can be performed in one operation, also without immediate fixation on the flange interface, wherein the hoisting frame acts as a counterweight for undesired tilting movements of the component, to compensate for the tilting moment as a result of the unstable centre of gravity location of the component. Because of the relative positions of the take-up cables and the centre of gravity of the hoisting frame, the invented device enables absorption of crane tip movements or hoisting hook moments in all directions (vertical and horizontal) by changing the position and orientation of the hoisting frame and the slings or take-up cables, while the component remains substantially stable.

A further advantage of the invented device is that it allows work to take place in considerably more unfavourable conditions, whereas the known device can only be deployed up to determined wind speeds and swell. The assembly time of a wind turbine can hereby be significantly reduced.

According to the invention, the hoisting frame is embodied such that in a first position of the hoisting frame relative to the hoisting hook the centre of gravity of the taken-up component and a centre of gravity of the hoisting frame are situated on either side of a vertical plane which runs through the hoisting hook and which runs perpendicularly of the plane defined by the take-up cables. This position of the centre of gravity is necessary to enable the desired counter-tilting moment to be generated. This measure can take different forms. In an embodiment it is thus possible to characterize the device in that the hoisting frame is asymmetrical relative to the vertical plane running through the hoisting hook. In another embodiment the device can be characterized in that the hoisting frame is weighted on the side of its centre of gravity, or has a downward hanging part on that side. This latter embodiment has additional advantages, as will be further elucidated below.

A further improved embodiment of the device further comprises positioning means which are configured to move the suspended hoisting frame relative to the hoisting hook between the first position and a second position, wherein both positions are included, and in which second position the centre of gravity of the hoisting frame is aligned with the hoisting hook in vertical direction. This embodiment makes it possible to bring the hoisting frame into positions lying between the two extremes (first and second). The horizontal distance from the centre of gravity of the hoisting frame to the vertical plane running through the hoisting hook can here be reduced to zero, whereby the centre of gravity of the hoisting frame is aligned with the hoisting hook in the vertical direction.

It is also possible to characterize the device according to an embodiment of the invention in that the positioning means are configured to move the hoisting frame relative to the hoisting hook from the first position into the second position. In this embodiment no fixation is possible in intermediate positions.

The above stated improved embodiments simplify removal of one or more of the take-up cables after the component was placed on the wind turbine tower and the two connecting flanges have been (permanently) connected to each other.

In a further embodiment of the device the hoisting frame has two take-up cables, and the two take-up cables engage on the component at positions situated on either side of the centre of gravity of the component. This provides for a more stable suspension of the component in the hoisting frame. It is otherwise also possible to provide one take-up cable or, conversely, more than two take-up cables.

The hoisting frame suspended from the hoisting hook can be moved relative to the hoisting hook from the first position into the second position in different ways using the positioning means.

In an embodiment it is thus possible to characterize the device in that the hoisting frame is suspended from the hoisting hook of the hoisting means in a hoisting point, and the positioning means are configured to displace the hoisting point along the hoisting frame, preferably in a substantially horizontal direction.

In another embodiment the device is characterized in that the hoisting frame is suspended from the hoisting hook of the hoisting means in a hoisting point, and the positioning means are configured to slide a slidable mass of the hoisting frame along the hoisting frame relative to the hoisting point, preferably in a substantially horizontal direction.

In yet another embodiment the device has the feature that the hoisting frame is suspended from the hoisting hook of the hoisting means in two hoisting points using two hoisting cables, and the positioning means are configured to tighten one of the two hoisting cables in order to change the position of the hoisting hook relative to the hoisting frame, preferably in substantially horizontal direction.

As already stated above, the hoisting frame can be weighted on the side of its centre of gravity, for instance by providing the hoisting frame with a downward hanging component. A device according to an embodiment wherein the hoisting frame comprises a downward hanging guide frame part which is provided on an underside with engaging means configured to engage a peripheral part of the wind turbine tower has the additional advantage that the hoisting frame is prevented or at least inhibited from making uncontrolled movements relative to the wind turbine tower. Owing to this multi-point suspension of the hoisting frame, the possible positions and orientations of the hoisting frame can be limited and the hoisting frame suspended in this way can function as shock absorber.

By making use of the guide frame part which supports on a support side on a peripheral part of the wind turbine tower by means of the engaging means the taken-up component is as it were temporarily flexibly connected to the wind turbine tower, whereby relative movements thereof relative to the wind turbine tower are reduced.

The engaging means of a device according to the above stated embodiment can if desired be configured to engage a peripheral part extending through a peripheral angle ≤180° of the periphery of the wind turbine tower. Suitable embodiments of the engaging means can be selected from bumpers, rollers, wheels, caterpillar tracks, suction cups and support straps, and combinations thereof.

It is possible to apply the device according to the invention without additional auxiliary means. It is however sometimes essential to apply auxiliary devices, particularly a tugger winch with tag line provided on the vessel—which also comprises the hoisting means. Using the tag line a hoisted component can be engaged and kept further under control. The tag line is tightened or payed out by means of the available tugger winch.

The device according to the invention is particularly suitable for mounting a component of a wind turbine on a wind turbine tower which is preferably present at sea, wherein the component comprises in embodiments a nacelle, a wind turbine blade and/or a rotor.

According to another aspect of the invention, a method is for this purpose provided for mounting a component of a wind turbine on a wind turbine tower and connecting a connection, such as a connecting flange, of the component to the wind turbine tower, wherein a centre of gravity of the component lies eccentrically relative to the connection, which method comprises the steps of:

providing a device according to any one of the foregoing claims;

suspending the hoisting frame from a hoisting hook of the hoisting means;

attaching the component to one or more take-up cables of the hoisting frame; and taking up the component with the hoisting frame, wherein in a first position of the hoisting frame relative to the hoisting hook a centre of gravity of the taken-up component and a centre of gravity of the hoisting frame are situated on either side of a vertical plane which runs through the hoisting hook and which does not comprise the centres of gravity;

bringing the taken-up component into the vicinity of the wind turbine tower using the hoisting means;

placing the component on the wind turbine tower;

connecting the connection of the component to the wind turbine tower;

uncoupling the component from the hoisting frame; and removing the hoisting frame.

A preferred method is characterized in that the suspended hoisting frame is moved relative to the hoisting hook between the first position and a second position using the positioning means, wherein both positions are included, and in which second position the centre of gravity of the hoisting frame is aligned with the hoisting hook in vertical direction.

A further embodiment provides a method wherein the hoisting frame is moved relative to the hoisting hook from the first position into the second position using the positioning means.

In a method according to yet another embodiment two take-up cables engage on the component at positions situated on either side of the centre of gravity of the component.

In other embodiments a method is provided wherein the hoisting frame is suspended from the hoisting hook of the hoisting means in a hoisting point, and the hoisting point is displaced along the hoisting frame, preferably in a substantially horizontal direction, and preferably after the component is placed on the wind turbine tower; and/or wherein the hoisting frame is suspended from the hoisting hook of the hoisting means in a hoisting point, and a slidable mass of the hoisting frame is slid along the hoisting frame relative to the hoisting point, preferably in a substantially horizontal direction, and preferably after the component is placed on the wind turbine tower; and/or wherein the hoisting frame is suspended from the hoisting hook of the hoisting means in two hoisting points using two hoisting cables, and one of the two hoisting cables is tightened, for instance with a winch, wherein the position of the hoisting hook relative to the hoisting frame is changed, preferably in substantially horizontal direction.

In the latter stated embodiment the position of the hoisting hook can be changed so that and until the hoisting hook is aligned with the centre of gravity of the hoisting frame in vertical direction.

In further improved embodiments of the invented method the hoisting frame comprises a downward hanging guide frame part which is provided on an underside with engaging means whereby a peripheral part of the wind turbine tower is engaged. The engaging means can here engage a peripheral part extending through a peripheral angle ≤180° of the periphery of the wind turbine tower.

With the invented method the component of the wind turbine can for instance comprise a nacelle, a wind turbine blade and/or a rotor.

In an embodiment of the method the component comprises a wind turbine blade, and the wind turbine blade is mounted on a hub of the wind turbine in a substantially horizontal position. This position is also referred to as a 3 o'clock position.

Another embodiment relates to a method wherein the component comprises a wind turbine blade, and the wind turbine blade is mounted on a hub of the wind turbine at an angle of substantially 0° to the vertical direction. This position is also referred to as a 6 o'clock position.

In the case the device is applied for placing at sea of a wind turbine constructed from components, work preferably takes place from a (floating) vessel, or from a jack-up platform, which provides more stability. The wind turbine tower is then already present at sea.

BRIEF DESCRIPTION OF THE DRAWINGS

The invention will now be elucidated in more detail with reference to the accompanying figures, without otherwise being limited thereto. In the figures:

FIG. 1A is a schematic perspective view of a nacelle of a wind turbine taken up in a hoisting frame according to an embodiment of the invention;

FIG. 1B is a schematic side view of the embodiment of the invention shown in FIG. 1A;

FIG. 3 is a schematic side view of the embodiment shown in FIG. 2B in a situation wherein the nacelle is placed on a wind turbine tower and wherein the hoisting frame comprises positioning means according to an embodiment of the invention;

FIG. 4 is a schematic side view of the embodiment shown in FIG. 2B in a situation wherein the nacelle is placed on a wind turbine tower and wherein the hoisting frame comprises positioning means according to another embodiment of the invention;

FIG. 8A is a schematic perspective view of a nacelle of a wind turbine taken up in a hoisting frame according to another embodiment of the device;

FIG. 8B is a schematic side view of the embodiment of the invention shown in FIG. 8A;

DESCRIPTION OF THE INVENTION

Figures 2A, 2B:
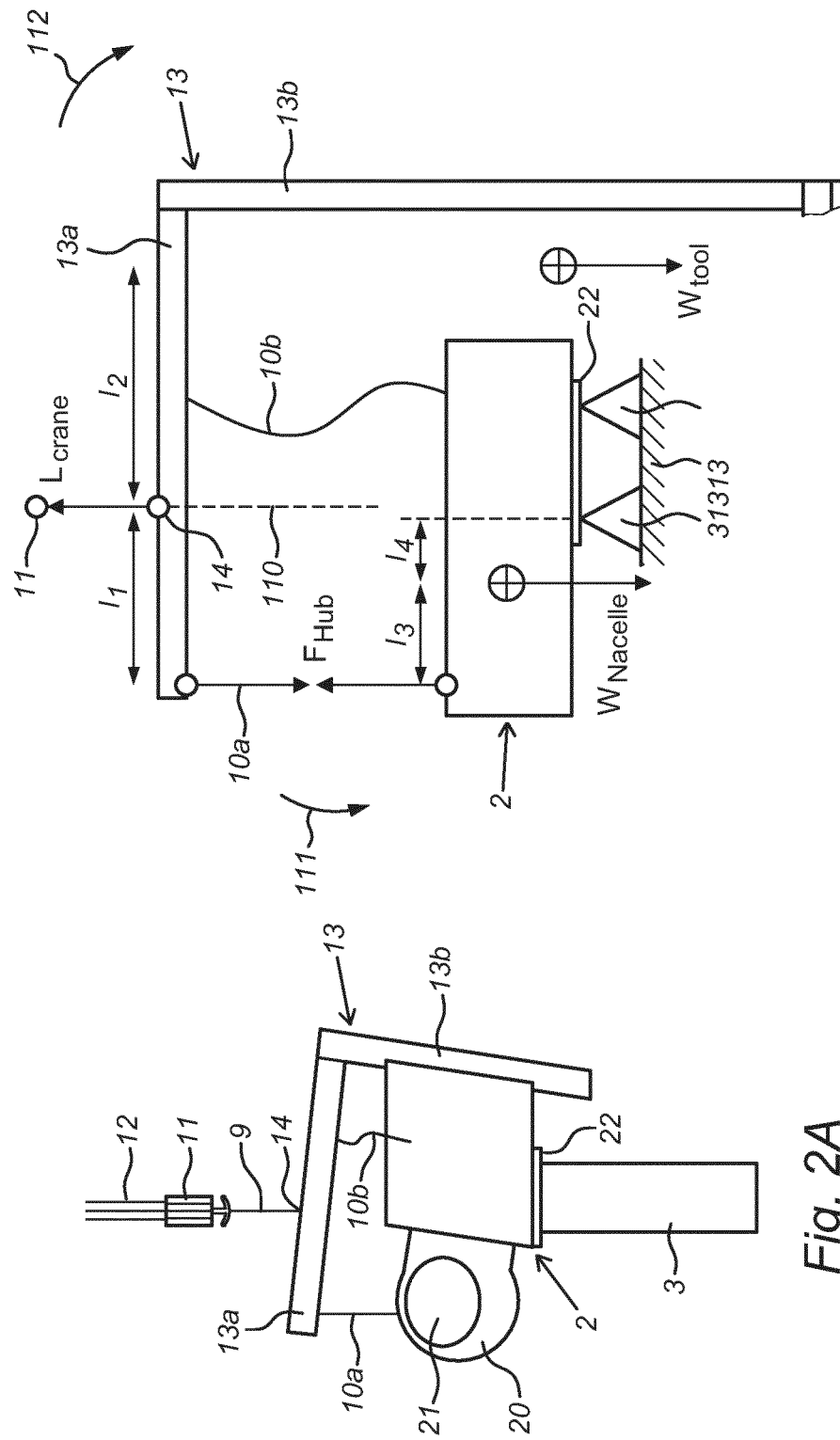
FIG. 2A is a schematic perspective view of the embodiment shown in FIG. 1A in a situation wherein the nacelle is placed on a wind turbine tower.
FIG. 2B is a schematic side view of the embodiment of the invention shown in FIG. 2A.

The same or similar components are designated in the figures with the same reference numerals.

Referring to FIG. 1A, a device 1 according to an embodiment of the invention is shown, wherein the device 1 is configured to mount a nacelle 2 of a turbine on a wind turbine tower 3 (see FIG. 2A). The nacelle 2 is provided with a hub 20 with openings 21 in which wind turbine blades can be arranged. Provided on an underside of nacelle 2 is a connecting flange 22. Using connecting flange 22 the nacelle 2 can be connected to an upper side of wind turbine tower 3, for instance by coupling connecting flange 22 to a receiving flange (not shown) present on an upper side of wind turbine tower 3.

Device 1 comprises a hoisting frame 13 which is suspended with a hoisting cable 9 from a hoisting block with hoisting hook 11, which in turn is suspended from hoisting cables 12 of a hoisting means (not shown), for instance a lifting crane. Nacelle 2 is suspended in the hoisting frame 13 using take-up cables (10a, 10b). In the shown embodiment hoisting frame 13 comprises an upper beam 13a to which a downward hanging side beam 13b is rigidly connected at an outer end. The hoisting cable 9 engages on the upper beam 13a of hoisting frame 13 in a hoisting point 14.

According to FIG. 1B, the centre of gravity $W_{nacelle}$ of nacelle 2 lies eccentrically relative to connecting flange 22. Hoisting frame 13 is embodied with the downward hanging side beam 13b such that in the shown first position of hoisting frame 13 relative to hoisting hook 11 the centre of gravity $W_{nacelle}$ of taken-up nacelle 2 and the centre of gravity $W_{tool}$ of hoisting frame 13 are situated on either side of a vertical plane 110 which runs through hoisting hook 11 and which does not comprise the centres of gravity $W_{tool}$ and $W_{nacelle}$. The vertical plane 110 running through hoisting hook 11 is shown in FIG. 1B as a plane which is perpendicular to the plane formed by the upper beam 13a and the side beam 13b of hoisting frame 13. Due to the presence of side beam 13b the hoisting frame 13 is asymmetrical relative to the vertical plane 110 running through hoisting hook 11, and is moreover weighted on the side of its centre of gravity $W_{tool}$.

The following distances are further indicated in FIG. 1B:
- $l_1$: the substantially horizontal distance from hoisting point 14 to first take-up cable 10a;
- $l_2$: the substantially horizontal distance from hoisting point 14 to the centre of gravity $W_{tool}$ of the hoisting frame;
- $l_3$: the substantially horizontal distance from first take-up cable 10a to the centre of gravity $W_{nacelle}$ of nacelle 2; and (according to FIG. 2B);
- $l_4$: the substantially horizontal distance from the centre of gravity $W_{nacelle}$ of nacelle 2 to the edge of the bearing 31 of wind turbine tower 3.

$F_{hub}$ is the force in the take-up cable 10a, while $L_{crane}$ is the hoisting force.

Referring to FIGS. 2A and 2B, a situation is shown in which the nacelle 2 was placed on a wind turbine tower 3 with interposing of the hoisting frame 13, and supports thereon. The support is shown schematically by the bearing 31. In this situation the second take-up cable 10b between hoisting frame 13 and nacelle 2 will be relieved and become slack at a given moment, as indicated. It should be taken into consideration here that hoisting point 14 is not stationary, but is subject to movements caused by movements of the lifting crane tip under the influence of for instance wave action. On the other hand, nacelle 2 must be mounted with connecting flange 22 on a corresponding receiving flange (not shown) of wind turbine tower 3. For this purpose the two flanges have to be held as stationary as possible relative to each other. The invented device 1 makes this possible. In the situation shown in FIG. 2B nacelle 2 will have a tendency to rotate counter-clockwise 111 because the centre of gravity $W_{nacelle}$ lies eccentrically relative to connecting flange 22 and bearing 31. The invented hoisting frame 13 prevents this in that hoisting frame 13 is able to generate a counter-torque 112 around the hoisting point 14, which counteracts the rotation 111. This counter-torque 112 is equal to $W_{tool} \cdot l_2$. This also means that first take-up cable 10a remains tightly tensioned.

Referring to FIG. 3, a further improved embodiment of device 1 is shown. According to FIG. 3, nacelle 2 has by now been secured with connecting flange 22 to wind turbine tower 3, for instance by means of bolts. This also allows the second take-up cable 10b to be removed. This second take-up cable 10b is indeed no longer visible in FIG. 3.

In order to now be able to safely release hoisting frame 13 from nacelle 2 positioning means (140, 150, 160) are provided which are configured to move the hoisting frame 13 suspended from hoisting cable 9 relative to hoisting hook 11 between the first position A and a second position B shown in FIGS. 1 and 2, wherein both positions (A, B) are included. In the second position B the centre of gravity $W_{tool}$ of hoisting frame 13 is aligned with hoisting hook 11 in vertical direction. In this position the centre of gravity $W_{tool}$ does indeed lie in the vertical plane 110. In the shown embodiment the positioning means comprise means 140 for displacing hoisting point 14 along upper beam 13a from the position designated with A to the position designated with B. These means 140 can for instance comprise a trolley which can be moved along upper beam 13a, but can also take any other suitable form. Because the centre of gravity $W_{tool}$ of hoisting means 13 is in this position aligned with hoisting hook 11 (or with hoisting point 14), the counter-torque 112 is substantially zero. This makes it possible to relieve the first take-up cable 10a, as shown, by lowering hoisting frame 13. After this, the first take-up cable 10a can be uncoupled from nacelle 2 in simple manner. The mounting of nacelle 2 on wind turbine tower 3 is hereby completed.

In another embodiment of device 1 the positioning means (140, 150, 160) comprise means 150 which are configured to move hoisting frame 13 relative to hoisting hook 11 from the first position A, in which the centre of gravity $W_{tool}$ is not aligned with hoisting hook 11, into the second position B, in which the centre of gravity $W_{tool}$ is aligned with hoisting hook 11, this by sliding a slidable mass 151 of hoisting frame 13 relative to hoisting point 14 along the upper beam 13a of hoisting frame 13, preferably in a substantially horizontal direction 152. The centre of gravity $W_{tool}$ is hereby displaced into a position B in which it is aligned with hoisting hook 11 (or with hoisting point 14). This provides the same effect as described above, i.e. a zero setting of the counter-torque 112.

Figure 5:
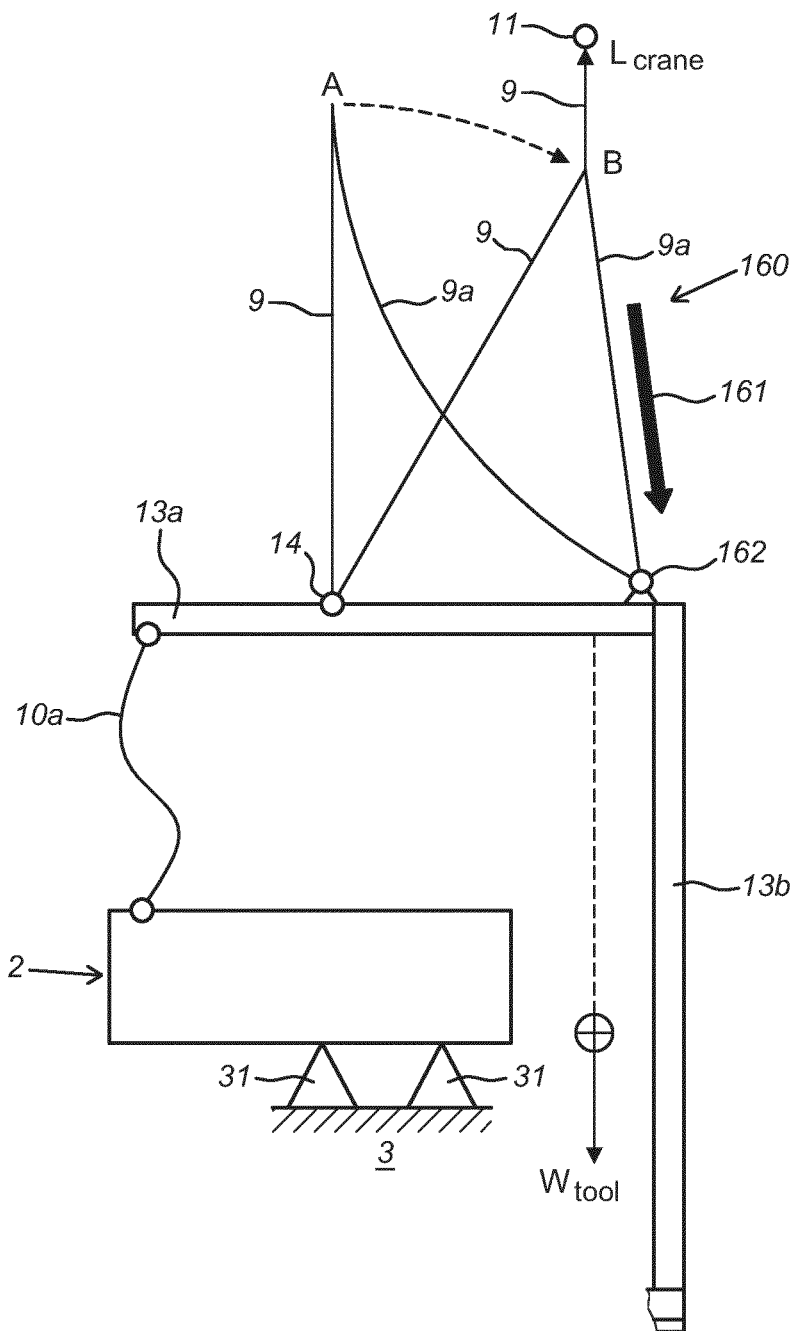
FIG. 5 is a schematic side view of the embodiment shown in FIG. 2B in a situation wherein the nacelle is placed on a wind turbine tower and wherein the hoisting frame comprises positioning means according to yet another embodiment of the invention.

Yet another embodiment of device 1 with the same objective is shown in FIG. 5. In this embodiment the positioning means (140, 150, 160) comprise means 160 which are once again configured to move hoisting frame 13 relative to hoisting hook 11 from the first position A, in which the centre of gravity $W_{tool}$ is not aligned with hoisting hook 11, into the second position B, in which the centre of gravity $W_{tool}$ is aligned with hoisting hook 11. In this embodiment hoisting frame 13 is suspended from hoisting hook 11 with two hoisting cables (9, 9a) in two hoisting points (14, 14a). In this embodiment the positioning means 160 are configured to tighten one of the two hoisting cables, and particularly this hoisting cable 9a which is slack in the position A, in order to change the position of hoisting hook 11 relative to hoisting frame 13 in substantially horizontal direction. By tightening the hoisting cable 9a the centre of gravity $W_{tool}$ of hoisting frame 13 can in this way be aligned with hoisting hook 11. Hoisting cable 9a can be tightened in any suitable manner of bringing it under tension 161, for instance with a winch 162. This once again has the same effect as described above, i.e. a zero setting of the counter-torque 112.

Figure 7:
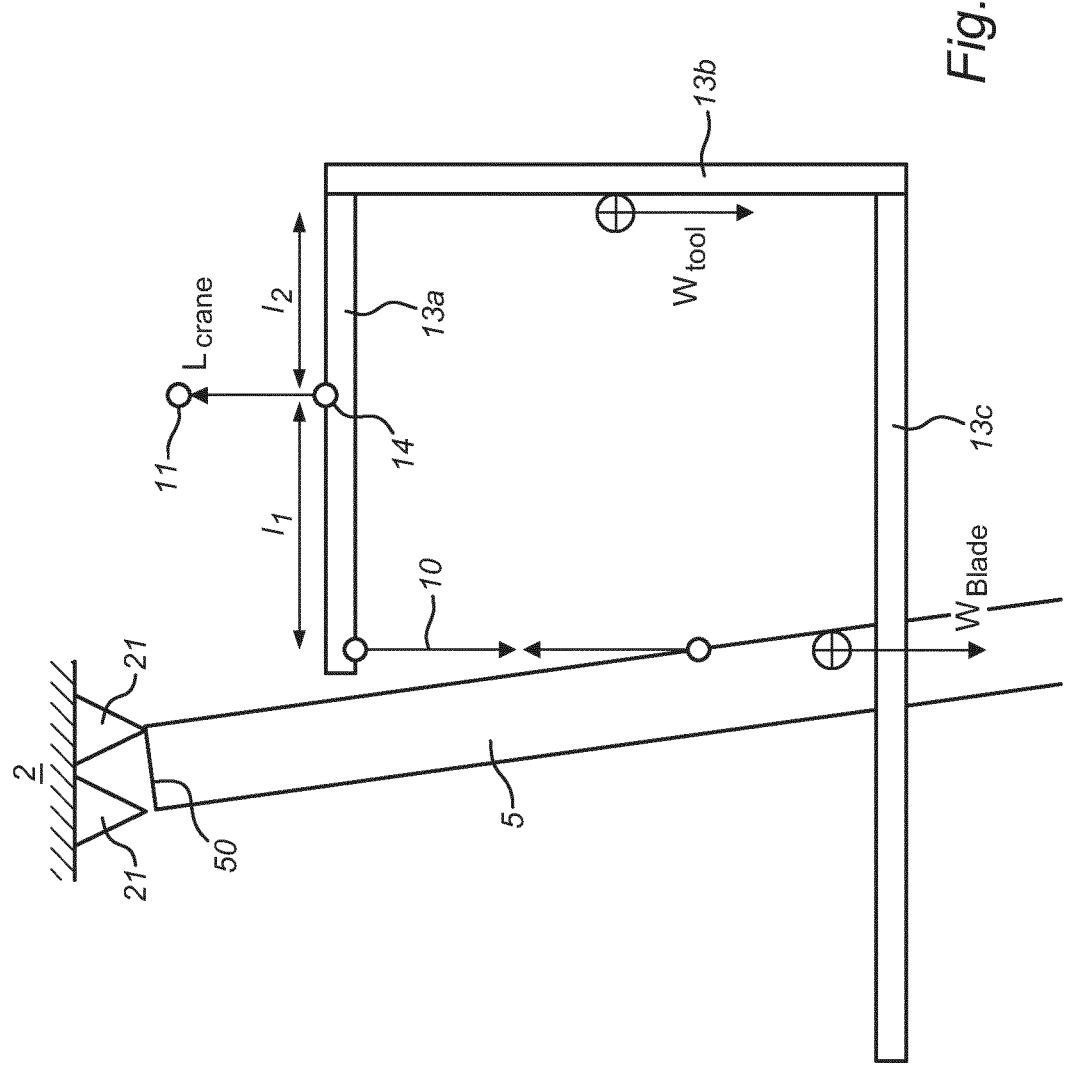
FIG. 7 is a schematic side view of a wind turbine blade of a wind turbine taken up in substantially vertical position in a hoisting frame according to an embodiment of the device.

FIG. 7 shows an embodiment of the hoisting frame 13 which is configured to arrange a wind turbine blade 5 in a substantially horizontal position in the openings 21 (represented schematically by the triangular bearing) of a nacelle already present on a wind turbine tower 3, and to anchor it thereto. The centre of gravity $W_{blade}$ of wind turbine blade 5 is here also positioned eccentrically relative to its connecting flange or other suitable connection to nacelle 2. Wind turbine blade 5 can hereby tilt relative to the suspension point 14 in the direction 111 if the outer end 50 of wind turbine blade 5 to be coupled is free. In order to counteract this movement the hoisting frame 13 is embodied such, for instance by providing it adjacently of upper beam 13a with a side beam 13b, and a horizontally running lower beam 13c, all rigidly connected, that its centre of gravity $W_{tool}$ lies on a different side of the vertical plane 110 than the centre of gravity $W_{blade}$ of wind turbine blade 5. The operation of this embodiment is further similar as described above, with the difference that wind turbine blade 5 is taken up in hoisting frame 13 by means of only one take-up cable 10. It will be apparent that the hoisting frame 13 preferably also comprises the above-described positioning means (140, 150, 160) in this embodiment.

Figure 6:
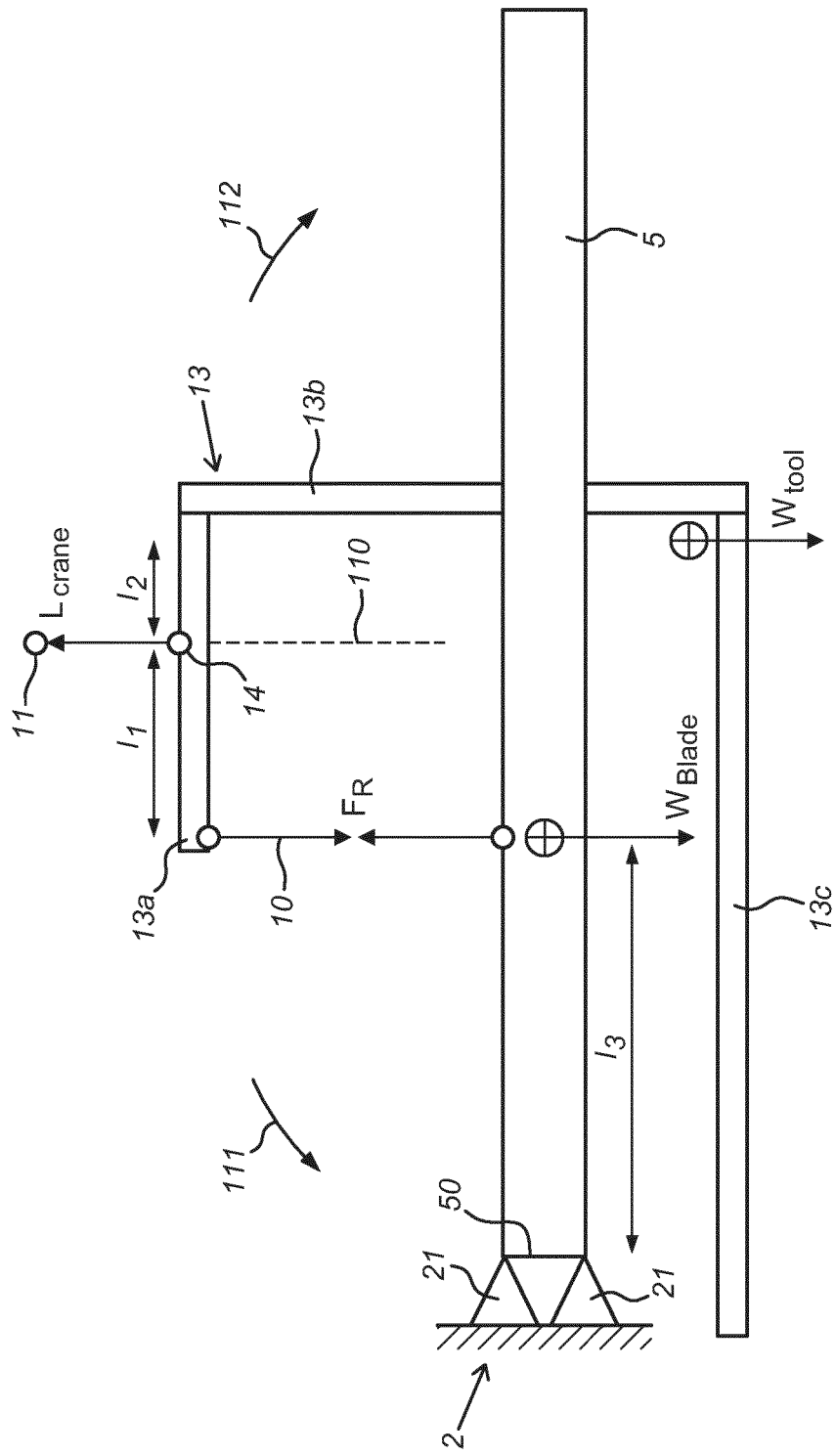
FIG. 6 is a schematic side view of a wind turbine blade of a wind turbine taken up in substantially horizontal position in a hoisting frame according to an embodiment of the device.

FIG. 7 shows yet another embodiment wherein wind turbine blade 5 is taken up in hoisting frame 13 in substantially vertical position. The operation is further the same as described in the context of FIG. 6.

Referring to FIG. 8A, hoisting frame 13 can further be provided with a guide frame 24 which is connected on one side to the downward hanging side beam 13b and which is provided on another side with engaging means 15 for engaging a peripheral part 3a of wind turbine tower 3.

Figures 9A, 9B:
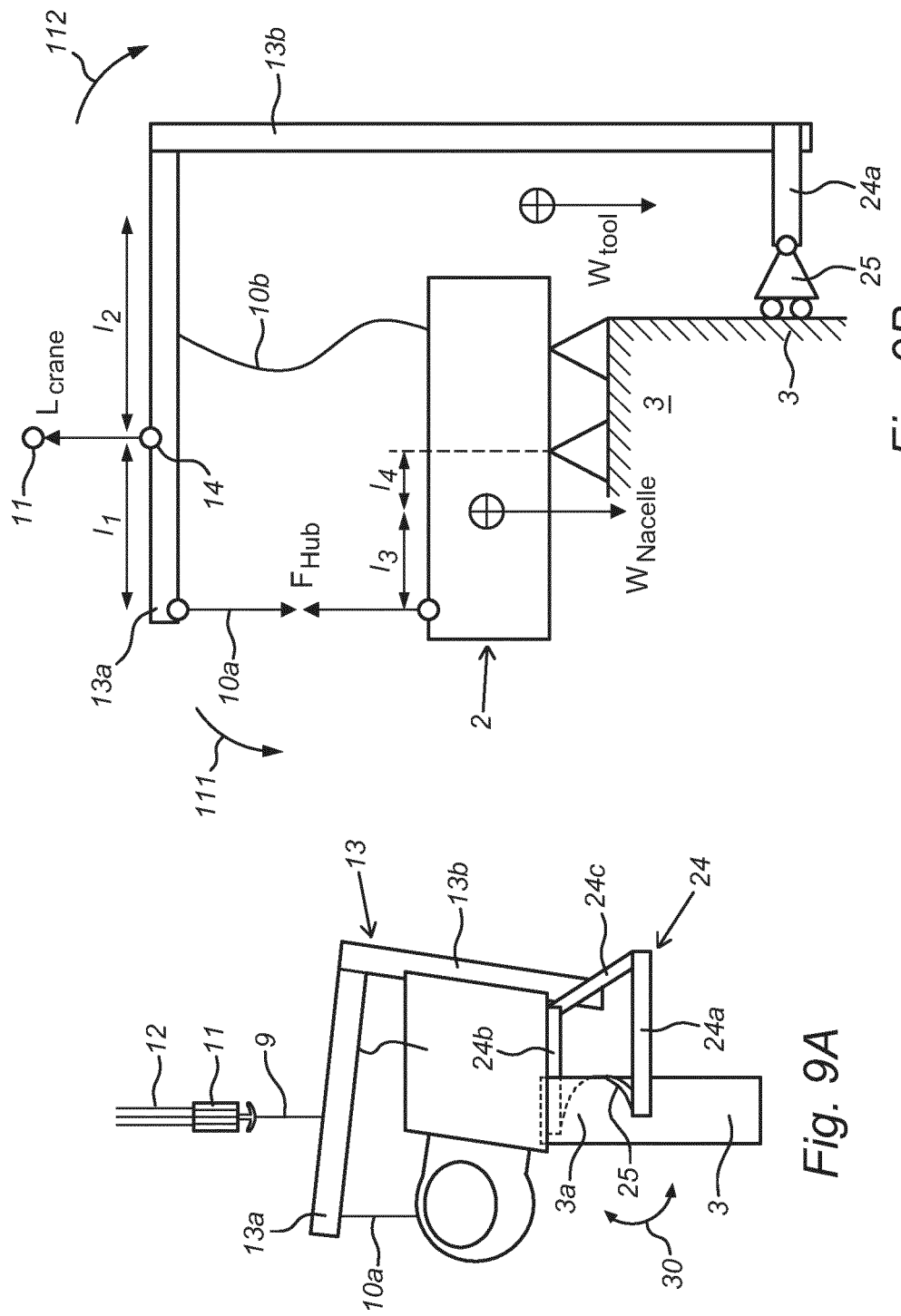
FIG. 9A is a schematic perspective view of the embodiment shown in FIG. 8A in a situation wherein the nacelle is placed on a wind turbine tower.
FIG. 9B is a schematic side view of the embodiment of the invention shown in FIG. 9A.
Figure 11:
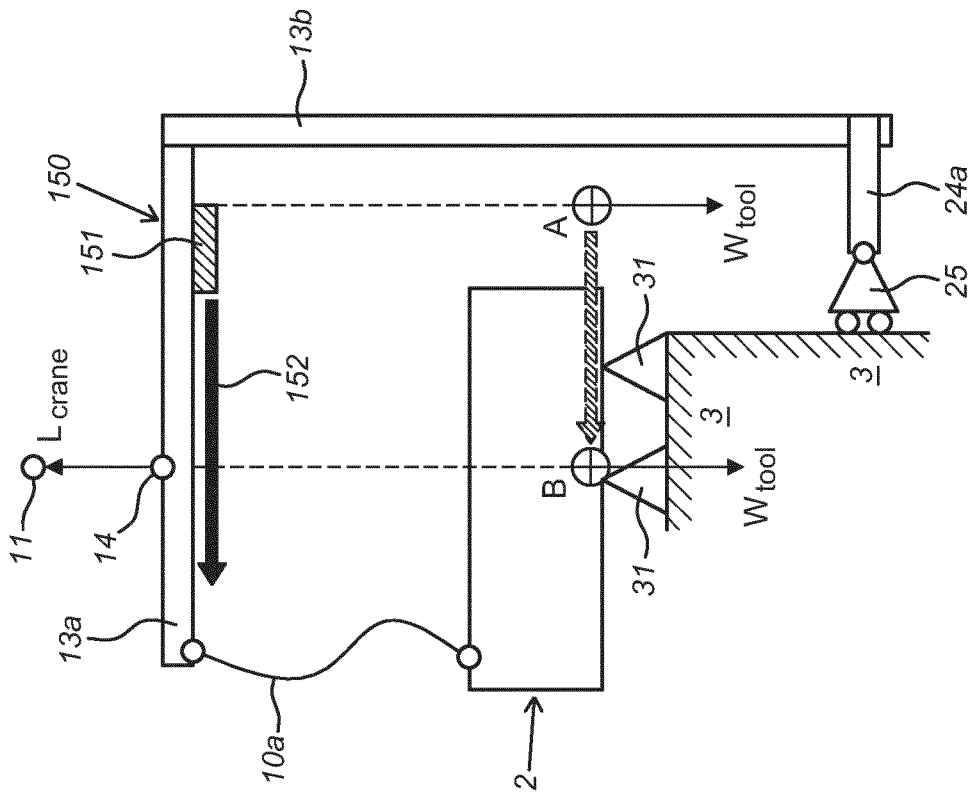
FIG. 11 is a schematic side view of the embodiment shown in FIG. 9B in a situation wherein the nacelle is placed on a wind turbine tower and wherein the hoisting frame comprises positioning means according to another embodiment of the invention.
Figure 10:
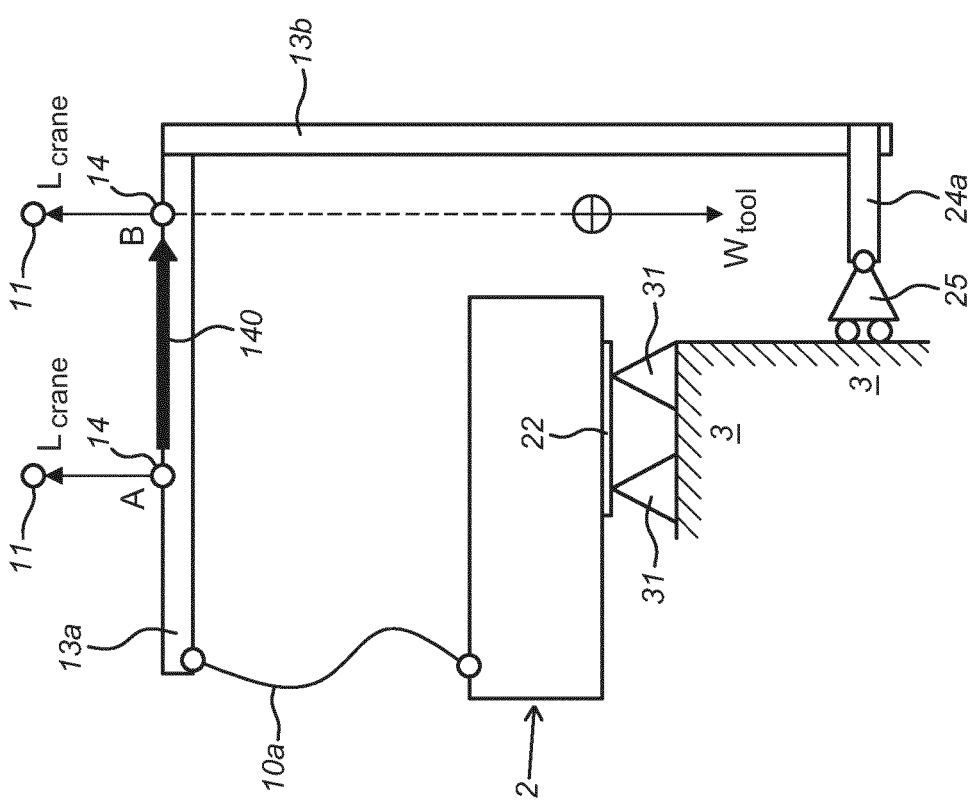
FIG. 10 is a schematic side view of the embodiment shown in FIG. 9B in a situation wherein the nacelle is placed on a wind turbine tower and wherein the hoisting frame comprises positioning means according to an embodiment of the invention.
Figure 12:
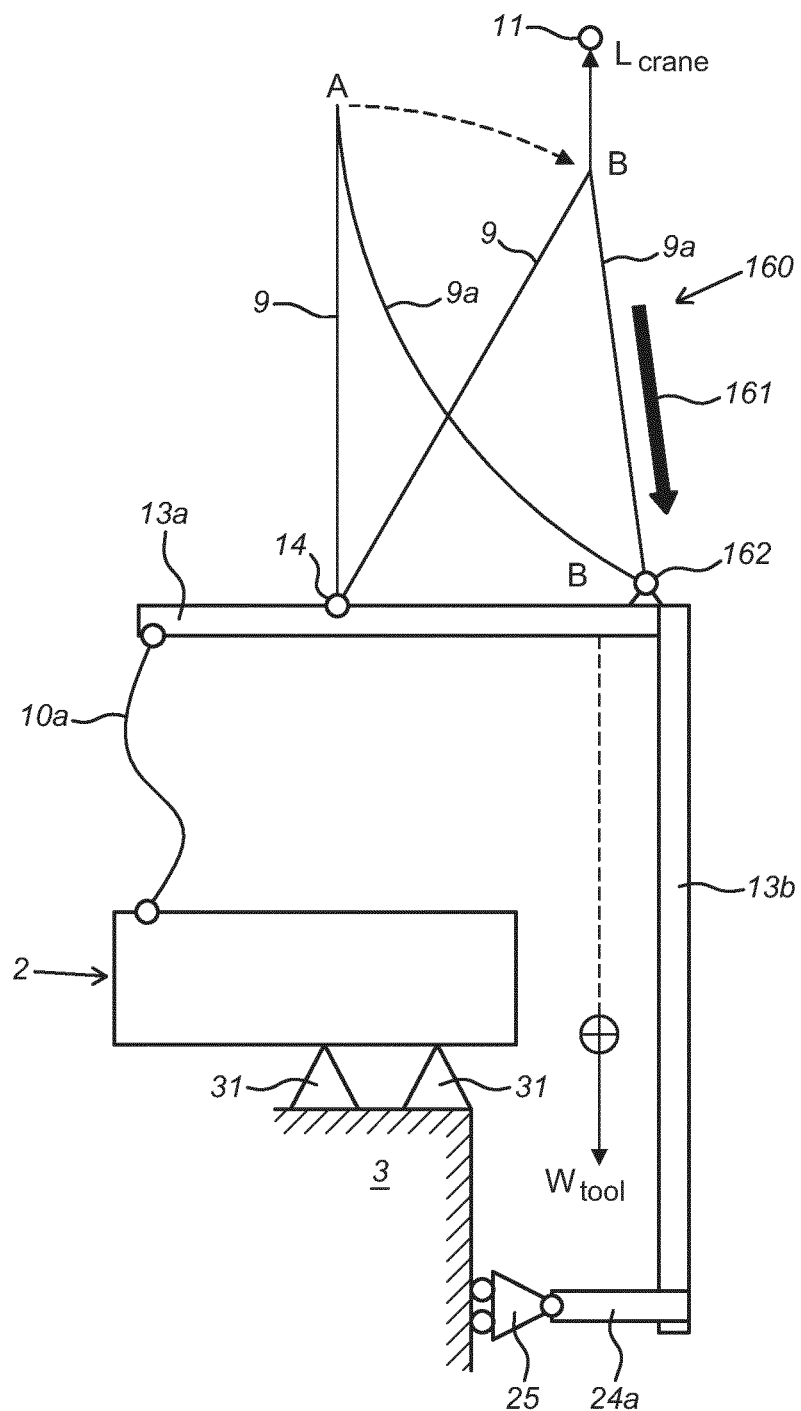
FIG. 12 is a schematic side view of the embodiment shown in FIG. 9B in a situation wherein the nacelle is placed on the wind turbine tower and wherein the hoisting frame comprises positioning means according to yet another embodiment of the invention.

In the embodiment shown in FIGS. 8A and 9A the engaging means 25 comprise a support strap which is placed in a peripheral direction 30 of wind turbine tower 3 and which is arranged on guide frame 24. This can also be a plurality of support straps, or for instance rollers. Guide frame 24 itself comprises two side arms (24a, 24b) which run substantially horizontally and which are connected to a horizontally running transverse beam 24c. Guide frame 24 can if desired be pivotally connected on one side to hoisting beam 13b. Engaging means 25 are configured to engage a peripheral part 3a which extends through a peripheral angle of for instance 180° of the periphery of wind turbine tower 3.

The operation of this embodiment has already been described above in detail with one difference. As shown schematically in FIGS. 9B and 10-12, nacelle 2 is brought into the vicinity of a top part of a turbine tower 3, wherein the engaging means in the form of support straps 25 are situated at the position of a peripheral part 3a of wind turbine tower 3 to be engaged. Peripheral part 3a is then engaged by the support straps 15, wherein, if desired, guide frame 24 can co-displace with relative movements of the (moving) nacelle 2 and the (stable) wind turbine tower 3 with some damping. This helps keep the relative movements between nacelle 2 and wind turbine tower 3 smaller, which simplifies making contact between the connecting flange 22 of nacelle 2 and a corresponding flange of wind turbine tower 3.

The method steps shown in FIGS. 8B, 9B, 10, 11 and 12 further correspond in respect of operation to the method steps as described above in respectively FIGS. 1B, 2B, 3, 4 and 5, wherein components are designated with the same reference numeral. In order to prevent unnecessary repetition reference is made to the relevant figure description.

Figure 13:
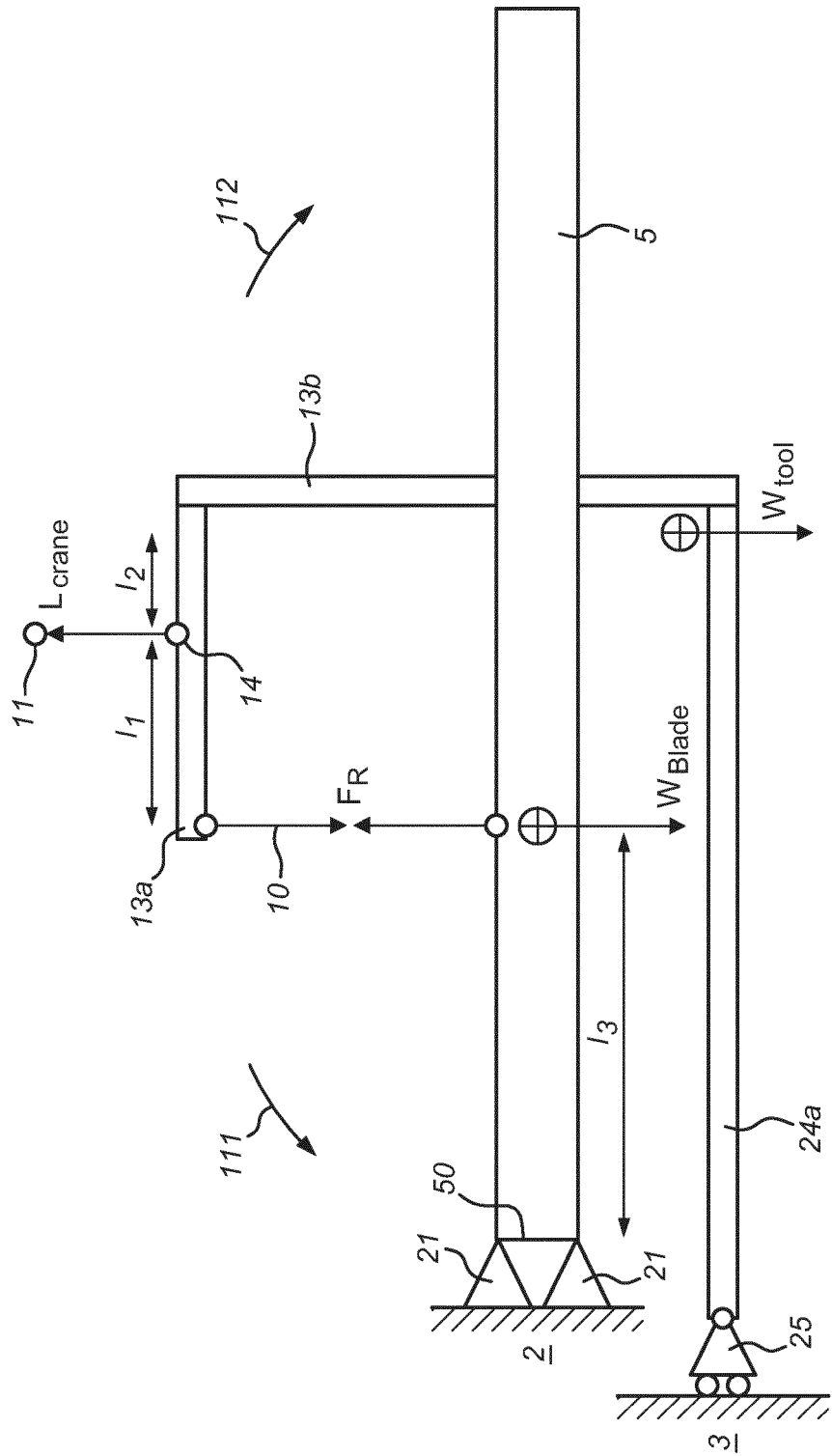
FIG. 13 is a schematic side view of a wind turbine blade of a wind turbine taken up in substantially horizontal position in a hoisting frame according to another embodiment of the device; and, finally
Figure 14:
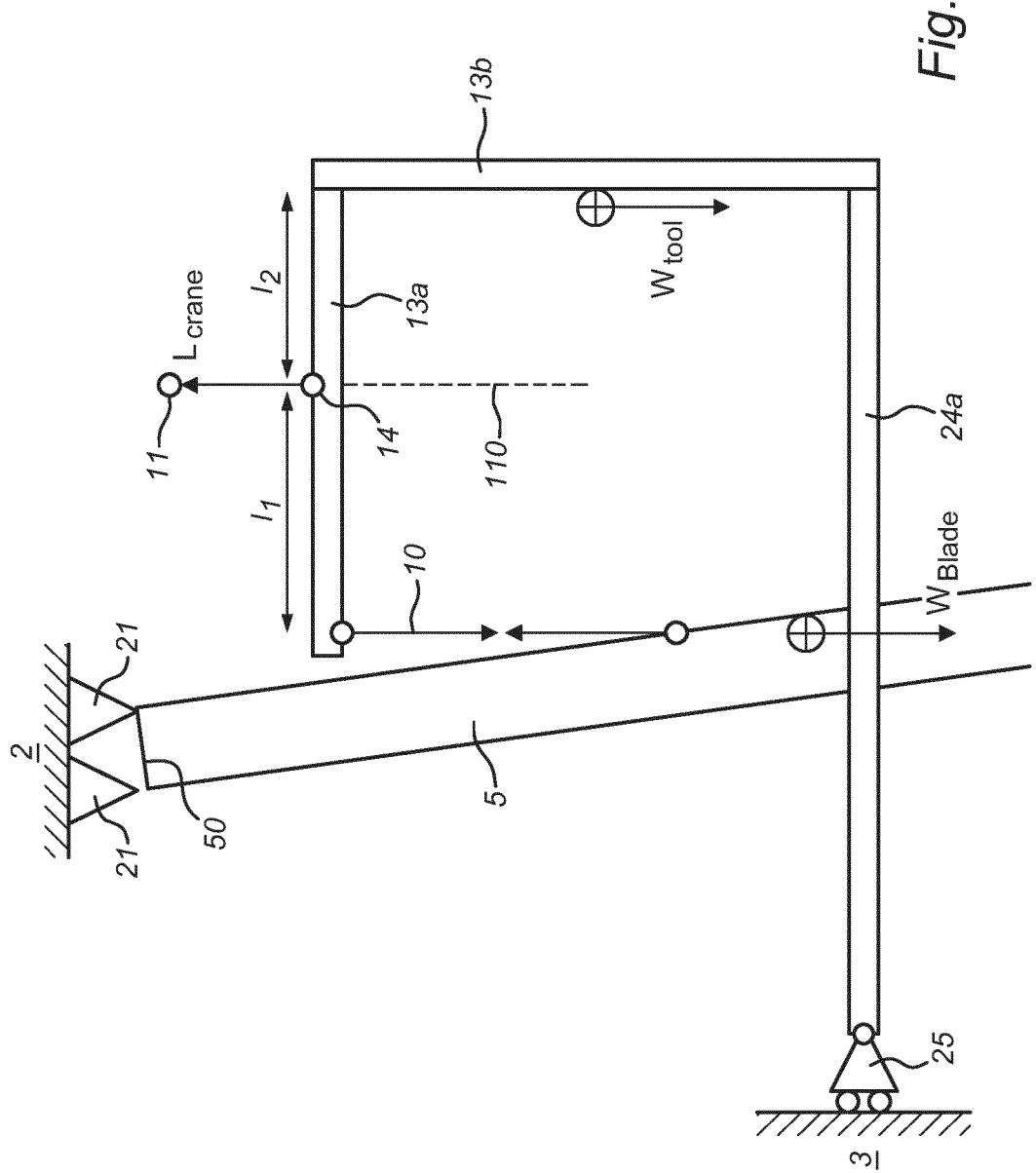
FIG. 14 is a schematic side view of a wind turbine blade of a wind turbine taken up in substantially vertical position in a hoisting frame according to an embodiment of the device.

The method steps shown in FIGS. 13 and 14 for mounting of a wind turbine blade 5 on a nacelle 2 further also correspond in respect of operation to the method steps as described above in respectively FIGS. 6 and 7, wherein components are designated with the same reference numeral. In order to prevent unnecessary repetition reference is also made here to the relevant figure description.

The invention claimed is:

1. A device for mounting on a wind turbine tower a wind turbine component with a connection, and with a centre of gravity which lies eccentrically relative to the connection, such as a connecting flange,
    wherein the device comprises a hoisting frame which is suspended from a hoisting hook of a hoisting means, and which is provided with one or more take-up cables whereby the component is taken up in the hoisting frame,
    wherein the hoisting frame is embodied such that in a first position of the hoisting frame relative to the hoisting hook the centre of gravity of a taken-up component and a centre of gravity of the hoisting frame are situated on either side of a vertical plane which runs through the hoisting hook and which does not comprise the centres of gravity, and
    wherein the hoisting frame comprises a downward hanging guide frame part which is provided on an underside with an engaging means configured to engage a peripheral part of the wind turbine tower.

2. The device according to claim 1, wherein the hoisting frame is asymmetrical relative to the vertical plane running through the hoisting hook.

3. The device according to claim 1, wherein the hoisting frame is weighted on the side of the centre of gravity.

4. The device according to claim 1, wherein the device further comprises a positioning means which are configured to move the suspended hoisting frame relative to the hoisting hook between the first position and a second position, wherein both positions are included, and in which the second position is in the centre of gravity of the hoisting frame is aligned with the hoisting hook in a vertical direction.

5. The device according to claim 4, wherein the positioning means are configured to move the hoisting frame relative to the hoisting hook from the first position into the second position.

6. The device according to claim 4, wherein the hoisting frame is suspended from the hoisting hook of the hoisting means in a hoisting point, and the positioning means are configured to displace the hoisting point along the hoisting frame, preferably in a horizontal direction.

7. The device according to claim 4, wherein the hoisting frame is suspended from the hoisting hook of the hoisting means in a hoisting point, and the positioning means are configured to slide a slidable mass of the hoisting frame along the hoisting frame relative to the hoisting point, preferably in a substantially horizontal direction.

8. The device according to claim 4, wherein the hoisting frame is suspended from the hoisting hook of the hoisting means in two hoisting points using two hoisting cables, and the positioning means are configured to tighten one of the two hoisting cables in order to change the position of the hoisting hook relative to the hoisting frame, in a horizontal direction.

9. The device according to claim 1, wherein the hoisting frame comprises two take-up cables, and the two take-up cables engage on the component at positions situated on either side of the centre of gravity of the component.

10. The device according to claim 1, wherein the engaging means are configured to engage a peripheral part extending through a peripheral angle ≤180° of the periphery of the wind turbine tower.

11. The device according to claim 1, wherein the engaging means are selected from bumpers, rollers, wheels, caterpillar tracks, suction cups and support straps, and combinations thereof.

12. The device according to claim 1, wherein the component of the wind turbine comprises a nacelle, a wind turbine blade and/or a rotor.

13. The device according to claim 1, provided on a vessel, particularly a floating platform, for placing the component of the wind turbine on the wind turbine tower available at sea.

14. A method for mounting a component of a wind turbine on a wind turbine tower and connecting a connection, such as a connecting flange, of the component to the wind turbine tower, wherein a centre of gravity of the component lies eccentrically relative to the connection, which method comprises the steps of:
   providing a device according to claim 1;
   suspending the hoisting frame from the hoisting hook of the hoisting means;
   attaching the component to one or more take-up cables of the hoisting frame; and
   taking up the component with the hoisting frame, wherein in the first position of the hoisting frame relative to the hoisting hook the centre of gravity of the taken-up component and the centre of gravity of the hoisting frame are situated on either side of the vertical plane which runs through the hoisting hook and which does not comprise the centres of gravity;
   bringing the taken-up component into the vicinity of the wind turbine tower using the hoisting means;
   engaging the peripheral part of the wind turbine tower with the downward hanging guide frame part;
   placing the component on the wind turbine tower;
   connecting a the connection of the component to the wind turbine tower;
   uncoupling the component from the hoisting frame; and
   removing the hoisting frame.

15. The method according to claim 14, wherein the suspended hoisting frame is moved relative to the hoisting hook between the first position and the second position using the positioning means, wherein both positions are included, and in which the second position is at the centre of gravity of the hoisting frame is aligned with the hoisting hook in the vertical direction.

16. The method according to claim 15, wherein the hoisting frame is moved relative to the hoisting hook from the first position into the second position using the positioning means.

17. The method according to claim 14, wherein two take-up cables engage on the component at positions situated on either side of the centre of gravity of the component.

18. The method according to claim 14, wherein the hoisting frame is suspended from the hoisting hook of the hoisting means in a hoisting point, and the hoisting point is displaced along the hoisting frame, preferably in a substantially horizontal direction, and preferably after the component is placed on the wind turbine tower.

19. The method according to claim 14, wherein the hoisting frame is suspended from the hoisting hook of the hoisting means in a hoisting point, and a slidable mass of the hoisting frame is slid along the hoisting frame relative to the hoisting point, preferably in a substantially horizontal direction, and preferably after the component is placed on the wind turbine tower.

20. The method according to claim 14, wherein the hoisting frame is suspended from the hoisting hook of the hoisting means in two hoisting points using two hoisting cables, and one of the two hoisting cables is tightened, for instance with a winch, wherein the position of the hoisting hook relative to the hoisting frame is changed, preferably in substantially horizontal direction.

21. The method according to claim 20, wherein the position of the hoisting hook is changed so that the hoisting hook is aligned with the centre of gravity of the hoisting frame in a vertical direction.

22. The method according to claim 14, wherein the engaging means engage a peripheral part extending through a peripheral angle ≤180° of the periphery of the wind turbine tower.

23. The method according to claim 14, wherein the component of the wind turbine comprises for instance a nacelle, a wind turbine blade and/or a rotor.

24. The method according to claim 23, wherein the component comprises a wind turbine blade, and the wind turbine blade is mounted on a hub of the wind turbine in a substantially horizontal position.

25. The method according to claim 23, wherein the component comprises a wind turbine blade, and the wind turbine blade is mounted on a hub of the wind turbine at an angle of substantially 0° to a vertical direction.

26. The method according to claim 14, wherein the component is mounted offshore from a vessel, particularly a floating platform, on a wind turbine tower available at sea.

\* \* \* \* \*

UNITED STATES PATENT AND TRADEMARK OFFICE
CERTIFICATE OF CORRECTION

PATENT NO. : 12,281,635 B2
APPLICATION NO. : 18/038860
DATED : April 22, 2025
INVENTOR(S) : Dieter Wim Jan Rabaut et al.

Page 1 of 1

It is certified that error appears in the above-identified patent and that said Letters Patent is hereby corrected as shown below:

In the Claims

Column 12, Line 10, Claim 14, delete "a the" and insert -- the --

Signed and Sealed this
Seventeenth Day of June, 2025

Coke Morgan Stewart
*Acting Director of the United States Patent and Trademark Office*